(12) United States Patent
Huang et al.

(10) Patent No.: US 11,681,680 B2
(45) Date of Patent: Jun. 20, 2023

(54) METHOD, DEVICE AND COMPUTER PROGRAM PRODUCT FOR MANAGING INDEX TABLES

(71) Applicant: EMC IP Holding Company LLC, Hopkinton, MA (US)

(72) Inventors: Frank Yifan Huang, Shanghai (CN); Jingjing Liu, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 139 days.

(21) Appl. No.: 16/831,376

(22) Filed: Mar. 26, 2020

(65) Prior Publication Data

US 2021/0097049 A1 Apr. 1, 2021

(30) Foreign Application Priority Data

Sep. 29, 2019 (CN) .......................... 201910932404.7

(51) Int. Cl.
*G06F 16/22* (2019.01)
*G06F 16/31* (2019.01)
*G06F 16/33* (2019.01)

(52) U.S. Cl.
CPC ........ *G06F 16/2282* (2019.01); *G06F 16/319* (2019.01); *G06F 16/328* (2019.01); *G06F 16/334* (2019.01)

(58) Field of Classification Search
CPC .. G06F 16/328; G06F 16/319; G06F 16/2282; G06F 16/334
See application file for complete search history.

(56) References Cited

U.S. PATENT DOCUMENTS 6,128,627 A * 10/2000 Mattis .................. G06F 16/221
6,389,461 B1 * 5/2002 Shah .................. G06F 16/9577
219/249

(Continued)

OTHER PUBLICATIONS

Brasetvik, Elasticsearch from the Bottom Up Part 1 Sep. 16, 2013, elastic, https://www.elastic.co/blog/found-elasticsearch-from-the-bottom-up/.*

(Continued)

*Primary Examiner* — Vaishali Shah
(74) *Attorney, Agent, or Firm* — Amin, Turocy & Watson, LLP

(57) ABSTRACT

Embodiments of the present disclosure provide a method, device, and computer program product for managing index tables. There is provided a method of managing index tables, comprising: determining the number of indexing requests for documents, the indexing requests being received within a predetermined period of time; obtaining information related to a processing index table in an index processing system, the processing index table being used for storing indices generated based on the indexing requests, the index processing system further comprising a receiving index table, the receiving index table being used for storing at least a part of the indices in the processing index table; and adjusting, based on the number of indexing requests and the obtained information, the number of processing index tables in the index processing system. Embodiments of the present disclosure can improve indexing throughput of an index processing system when massive data arrive, and avoid the problem of infinite growth of index tables.

20 Claims, 10 Drawing Sheets

(56) References Cited

U.S. PATENT DOCUMENTS

| | | | | |
|---|---|---|---|---|
| 8,498,984 | B1* | 7/2013 | Hwang | G06F 16/951 707/723 |
| 10,263,908 | B1* | 4/2019 | Ganjoo | H04L 43/16 |
| 10,380,124 | B2* | 8/2019 | Gage | G06F 16/9532 |
| 2004/0260680 | A1* | 12/2004 | Best | G06F 16/9535 |
| 2008/0033592 | A1* | 2/2008 | Okrongli | G05B 19/4083 700/179 |
| 2008/0059873 | A1* | 3/2008 | Oezgen | G06F 16/31 707/E17.083 |
| 2010/0094870 | A1* | 4/2010 | Narang | G06F 16/93 707/736 |
| 2012/0203794 | A1* | 8/2012 | Zhang | G06F 16/24539 707/804 |
| 2016/0085810 | A1* | 3/2016 | de Castro Alves | G06F 16/24568 707/752 |
| 2021/0081389 | A1* | 3/2021 | Liu | G06F 16/244 |

OTHER PUBLICATIONS

Brasetvik, Elasticsearch from the Top Down Oct. 14, 2014, elastic, https://www.elastic.co/blog/found-elasticsearch-top-down.*

Elasticsearch Guide 7.0 Section "How To" subsection "Tune for disk usage" [date unknown], elastic, https://www.elastic.co/guide/en/elasticsearch/reference/7.0/tune-for-disk-usage.html.*

Elasticsearch Guide 7.0 Section "Index Shard Allocation" subsection "Total shards per node" [date unknown], elastic, https://www.elastic.co/guide/en/elasticsearch/reference/7.0/allocation-total-shards.html.*

Elasticsearch Guide 7.0 Section "Set up Elasticsearch" subsection "adding nodes to your cluster" [date unknown], elastic, https://www.elastic.co/guide/en/elasticsearch/reference/7.0/add-elasticsearch-nodes.html.*

Elasticsearch Guide 7.0 Section "Getting started with Elasticsearch" subsection "Get Elasticsearch up and running" [date unknown], elastic, https://www.elastic.co/guide/en/elasticsearch/reference/7.0/getting-started-install.html.*

Christian_Dahlqvist et al., Hardware Recommendation Nov. 16, elastic, https://discuss.elastic.co/t/hardware-recommendation/66833.*

Connelly, Elasticsearch 7.0.0 Released Apr. 10, 2019, elastic, https://www.elastic.co/blog/elasticsearch-7-0-0-released.*

Lucene Core News "Mar. 14, 2019—Apache Lucene™ 8.0.0 available" Mar. 14, 2019, lucene.apache.org, https://lucene.apache.org/core/corenews.html#:~:text=14%20March%202019%20%2D%20Apache%20Lucene,0%20available.*

Eribeiro et al., Understanding Segement Merge by Lucene Aug. 13, 2018, Stack overflow, https://stackoverflow.com/questions/51817307/understanding-segement-merge-by-lucene.*

Amazon Elasticsearch Service doubles maximum cluster capacity with 200 node cluster support Jan. 23, 2019, aws.amazon.com, https://aws.amazon.com/about-aws/whats-new/2019/01/amazon-elasticsearch-service-doubles-maximum-cluster-capacity-with-200-node-cluster-support/.*

Candless, Visualizing Lucene's segment merges Feb. 11, 2011, blog.mikemccandless.com, https://blog.mikemccandless.com/2011/02/visualizing-lucenes-segment-merges.html.*

Elasticsearch Guide 7.0 Section "Index modules" subsection "Translog" [date unknown], elastic, https://www.elastic.co/guide/en/elasticsearch/reference/7.0/index-modules-translog.html.*

Lucene API Class IndexWriter [date unknown], apache, 8.0.0, https://lucene.apache.org/core/8_0_0/core/org/apache/lucene/index/IndexWriter.html.*

Lucene API Class LogByteSizeMergePolicy [date unknown], apache, 8.0.0., https://lucene.apache.org/core/8_0_0/core/org/apache/lucene/index/LogByteSizeMergePolicy.html.*

Elasticsearch Reference 7.0 [date unknown—captured on May 11, 2019 by archive.org], https://web.archive.org/web/20190511143449/https://www.elastic.co/guide/en/elasticsearch/reference/7.0/index.html.*

* cited by examiner

METHOD, DEVICE AND COMPUTER PROGRAM PRODUCT FOR MANAGING INDEX TABLES

FIELD

Embodiments of the present disclosure generally relate to the field of information processing, and more specifically, to a method, device and computer program product for managing index tables.

BACKGROUND

Nowadays, most popular full-text search engines implement indexing and search using a full-text search engine toolkit depending on inverted index tables (also referred to as "index tables" herein). However, an inverted index table is associated with a limited number of documents only, and therefore, it is impossible for the inverted index table to process high indexing request throughput. Moreover, when there are too many entries in an inverted index table, indexing and search will be slow.

Streaming data is unbounded data generated continuously by various sources. The streaming data includes various data, such as log files, sensor data, social network data, and the like. Streaming data is usually unbounded, appended only, and unpredictable in size. Streaming data always requires real-time processing. Due to the characteristics of the streaming data, an efficient streaming search engine must have the following capabilities: a capability of processing unbounded data, a capability of processing suddenly increased data with low latency; and a capability of deleting expired data efficiently. However, when processing streaming data, traditional full-text search engines still have some limitations in capacity and performance.

SUMMARY

Embodiments of the present disclosure provide a method, device and computer program product for managing index tables.

In a first aspect of the present disclosure, there is provided a method of managing index tables. The method comprises: determining the number of indexing requests for documents, the indexing requests being received within a predetermined period of time; obtaining information related to a processing index table in an index processing system, the processing index table being used for storing indices generated based on the indexing requests, the index processing system further comprising a receiving index table, the receiving index table being used for storing at least a part of the indices in the processing index table; and adjusting, based on the number of indexing requests and the obtained information, the number of processing index tables in the index processing system.

In a second aspect of the present disclosure, there is provided an electronic device. The device comprises: at least one processing unit; and at least one memory coupled to the at least one processing unit and storing thereon instructions executed by the at least one processing unit, the instructions, when executed by the at least one processing unit, causing the device to perform acts of: determine the number of indexing requests for documents, the indexing requests being received within a predetermined period of time; obtain information related to a processing index table in an index processing system, the processing index table being used for storing indices generated based on the indexing requests, the index processing system further comprising a receiving index table, the receiving index table being used for storing at least a part of the indices in the processing index table; and adjusting, based on the number of indexing requests and the obtained information, the number of processing index tables in the index processing system.

In a third aspect of the present disclosure, there is provided a computer program product. The computer program product is tangibly stored on a non-transitory computer storage medium and comprises machine-executable instructions. The machine-executable instructions, when executed by a device, cause the device to perform any step of the method as described according to the first aspect of the present disclosure.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

The above and other objectives, features and advantages of the present disclosure will become more apparent, through the following detailed description on the example embodiments of the present disclosure with reference to the accompanying drawings in which the same reference symbols refer to the same components.

Throughout the drawings, the same or similar reference symbols refer to the same or similar elements.

DETAILED DESCRIPTION OF EMBODIMENTS

Figure 1:
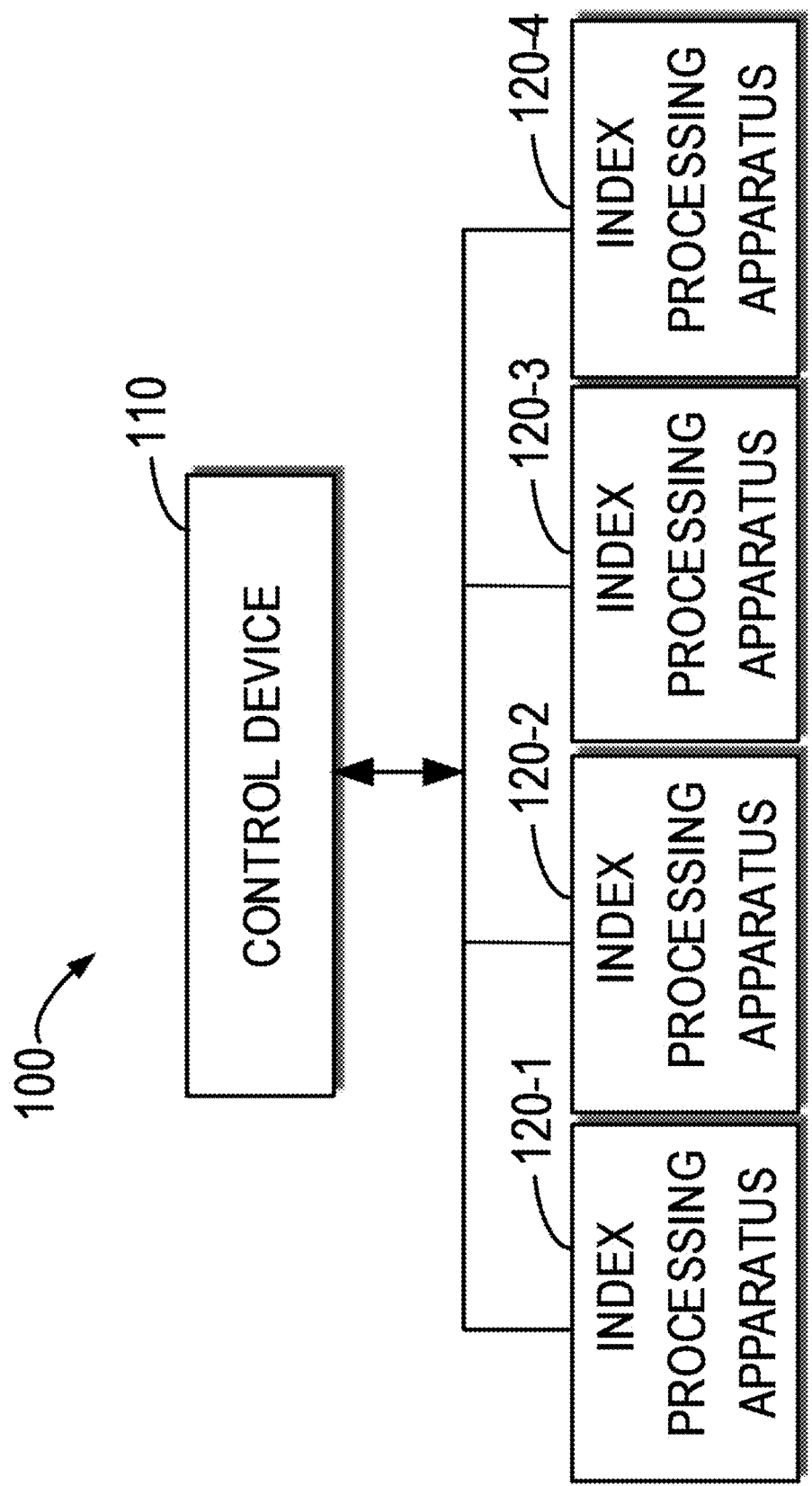
FIG. 1 illustrates a block diagram of an example index processing system in which embodiments of the present disclosure can be implemented.

Preferred embodiments of the present disclosure will now be described in more detail with reference to the drawings.

Although the preferred embodiments of the present disclosure are illustrated in the drawings, it should be appreciated that the present disclosure may be implemented in various manners but cannot be limited by the embodiments as described herein. Rather, these embodiments are provided to disclose the present disclosure more thoroughly and completely, and to convey the scope of the present disclosure fully to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example embodiment" and "an embodiment" are to be read as "at least one example embodiment." The term "another embodiment" is to be read as "at least one other embodiment." The terms "first," "second," and the like may refer to different or same objects. Other definitions, explicit and implicit, may be included below.

Nowadays, most popular full-text search engines implement indexing and search using a full-text search engine toolkit (e.g., Lucene) depending on inverted index tables. An inverted index table is a data structure for storing mappings from terms to document ID. During indexing, a document is converted into a set of terms by an analyzer which will perform language detection, tokenization, lemmatization, stopword filtering, and the like. Then, an index table is created using the terms as keys and document IDs as values. During search, keywords also leverage the same analyzer for language analysis, and then use the obtained terms to retrieve documents associated with the terms.

A document associated with the index table is not in a contiguous disk space. To avoid random I/O access, adding a new document will not update the main index table directly, but instead create small index tables (also referred to as "segment"). A search engine toolkit (e.g., Lucene) merges several small index tables of a similar size into a single small index table of a relatively larger size through a background merge process, and then deletes these small index tables. This process is repeated on small index tables with a relatively larger size, when there are too many small index tables with a relatively larger but similar size. In the course of deleting documents, documents associated with the main index table are not removed immediately, but instead documents associated with small index tables are marked as deleted, and then removed during the merge process. The merge process is similar to merge sorting, which leverages sequential I/O and can improve the performance significantly.

Since the search system searches an index table, rather than searching documents directly, it can achieve fast search responses. Leveraging an index table can help to find desired results from billions of documents with low latency. However, nowadays, a single index table can be associated with a limited number of documents only. Typically, a single index table can be associated with at most a particular number (e.g., $2^{31}+1$) of documents. Therefore, it cannot handle high indexing request throughput. In addition, when there are too many entries in an index table, indexing and search will be slow.

For better scalability and availability, modern search engines (such as Elastic Search and Solr) split a single index table into multiple smaller index tables (also referred to as "shard") and distribute these smaller index tables across cluster nodes. However, this brings about some disadvantages. An appropriate increase in the number of the smaller index tables can improve the indexing throughput and the search performance, while too many smaller index tables may result in a degraded search performance. Since the searched data exist in all of the smaller index tables, the search engine has to perform a search on each of smaller index tables, obtain results, and merge the obtained results. As a result, if there are too many smaller index tables, for example, when the number of smaller index tables is greater than the number of cluster nodes, a search will be performed on the same node multiple times, and the merge process is affected. On the other hand, too few smaller index tables may also degrade the performance due to not using all of the nodes.

In a streaming search system, as aforementioned, since the amount of streaming data is changing and may be increased suddenly for various reasons, an efficient streaming search system must have a capability of processing unbounded data, a capability of handling a sudden burst of data with low latency, and a capacity of deleting expired data. As a result, in the streaming search system, it is important to ensure that a single index table is not too large, the number of index tables can be dynamically increased to handle a sudden burst of data, and dynamically decreased when old data is purged or workload drops, without additional system overhead.

Modern search engines leverage a plurality of index tables to increase scalability and capacity, however, the number of index tables is determined and unchangeable once created. Since the index table stores mappings from terms to documents, there is no way to separate the index table by documents directly.

The traditional method of splitting an index table includes: first creating a new index table having a subset of the set of document IDs, then deleting association of documents corresponding to the subset with the existing index table, and associating these documents with the new index table. The effort is equivalent to re-indexing these documents. For example, assuming that 1,000 documents can be indexed per second, it will take 12 days to re-index 1 billion documents. During the period, the performance of indexing and search will be affected. When dealing with streaming data which are unbounded in size and unpredictable in arrival time, a fixed number of index tables have a limited capacity and may result in performance issues.

Embodiments of the present disclosure provide a solution for managing index tables, so as to solve the above problem and one or more of other potential problems. The solution can index streaming data by dynamically adjusting the number of index tables, thereby improving the capacity and performance of the search system.

FIG. 1 illustrates a block diagram of an example index processing system 100 in which embodiments of the present disclosure can be implemented therein. As shown in FIG. 1, the index processing system 100 includes a control device 110 and one or more index processing apparatuses 120-1 to 120-4 (collectively referred to as index processing apparatus 120). Various methods according to embodiments of the present disclosure can be implemented at the control device 110. It should be appreciated that the structure of the index processing system 100 is described merely as an example, without implying any limitation to the scope of the present disclosure. For example, the embodiments of the present application are applicable to systems different from the index processing system 100. It would be appreciated that the specific number of devices are provided merely as an example, without implying any limitation to the scope of the present disclosure. For example, the embodiments of the present disclosure are applicable to more or fewer devices.

The control device 110 is a device for receiving requests and controlling the processing of requests, the request may be, for example, a request for indexing a document, a request for searching a keyword, a request for obtaining a document, a request for deleting a document, and the like. The control device 110 may be, for example, a computer, a virtual machine, a server, and the like. The control device 100 may also be used to receive streaming data, or the streaming data may also be received by a separate data storage device (not shown). The present disclosure is not limited in this regard.

The index processing apparatus 120 is a device for processing various requests according to scheduling of the control device 110. The index processing apparatus 120 may store therein processing index tables and receiving index tables according to embodiments of the present disclosure. In some embodiments, the index processing apparatus 120 may be a physical node such as a computer, a server, and the like. Alternatively, in some other embodiments, the index processing apparatus 120 may be a distributed resource unit distributed over a plurality of physical nodes, such as a pod, a container, and the like. In a preferred embodiment, the index processing apparatus 120 may be a Kubernetes pod because it can be generated dynamically.

The control device 110 and the index processing apparatus 120 communicate with each other via a network which may be Internet, intranet, and the like.

Figure 2:
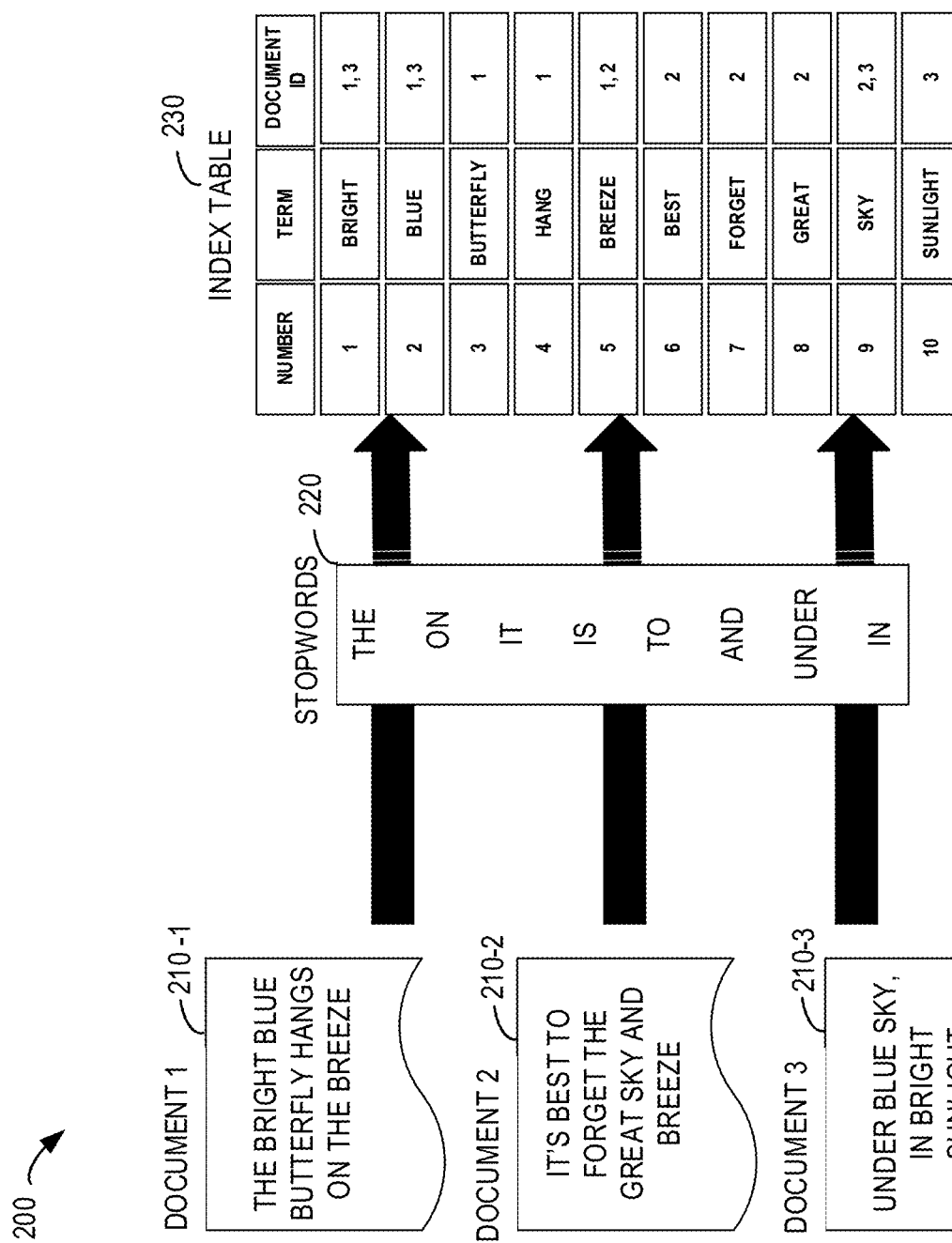
FIG. 2 illustrates a schematic diagram of a process of creating an index table from documents adapted to embodiments of the present disclosure.

FIG. 2 illustrates a schematic diagram of a process 200 of creating an index table from documents adapted to embodiments of the present disclosure. As shown in FIG. 2, during indexing, the control device causes the index processing apparatus 120 to analyze texts of documents 210-1, 210-2 and 210-3, filter stopwords 220, and then obtain an index table 230. In the index table 230, each entry includes an obtained term and document IDs including the term. For example, if a word "bright" hits the document 1 210-1 and the document 3 210-3, the entry associated with the word "bright" includes the term "bright" and the document IDs 1 and 3. During search, when the keyword searched by a user is "bright", the control device 110 causes the index processing apparatus 120 to retrieve the documents 1 and 3 associated with "bright" and present them to the user.

Figure 3:
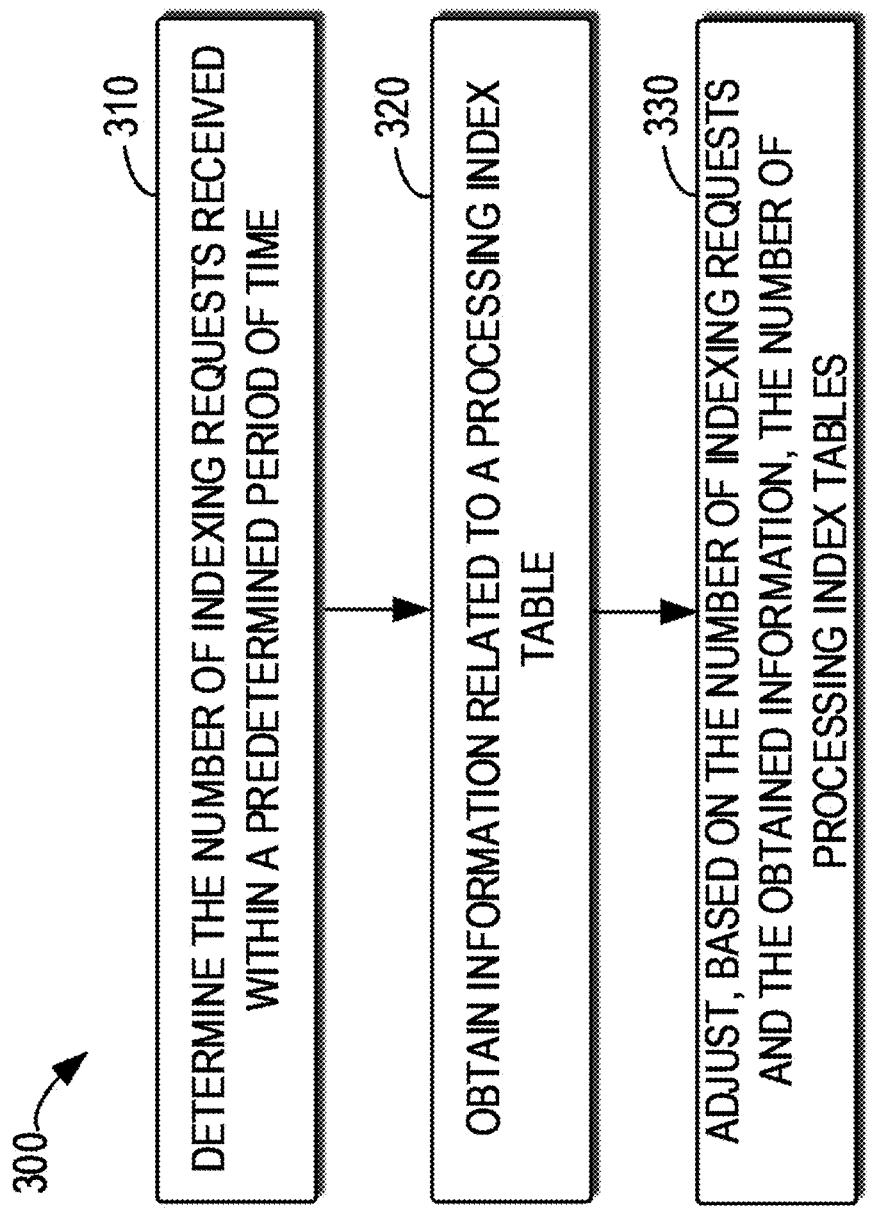
FIG. 3 illustrates a flowchart of an example method of managing index tables according to embodiments of the present disclosure.

FIG. 3 illustrates a flowchart of an example method 300 of managing index tables according to embodiments of the present disclosure. For example, the method 300 may be performed by the control device 110 as shown in FIG. 1. It should be appreciated that the method 300 may also be performed by other devices, and the scope of the present disclosure is not limited in this regard. It should be also appreciated that the method 300 may also include additional acts not shown and/or may skip the acts shown therein, and the scope of the present disclosure is not limited in the regard.

The method 300 will be described in detail below with reference to FIGS. 1 and 3.

Upon receiving an indexing request for a document, the control device 110 allocates the indexing request to an index processing apparatus (for example, the index processing apparatus 120-1) in a specified set of index processing apparatuses 120 for processing, according to a predetermined allocation policy, and the index processing apparatus 120-1 creates, based on the indexing request, indices for the associated document as shown in FIG. 2, and stores the created indices into a processing index table in the index processing apparatus 120-1.

At 310, the control device 110 determines the number of indexing requests for documents received within a predetermined period of time.

In some embodiments, the control device 110 periodically determines the number of indexing requests received within a previous period of time. Alternatively or additionally, the control device 110 may also determine the number of indexing requests received within the previous period of time, upon occurrence of a particular event, for example, according to a user request. It should be readily appreciated that, if the predetermined period of time is unchanged, the larger the number of requests received, the higher the requirement to the index processing system is in terms of real-time processing speed.

Figure 4:
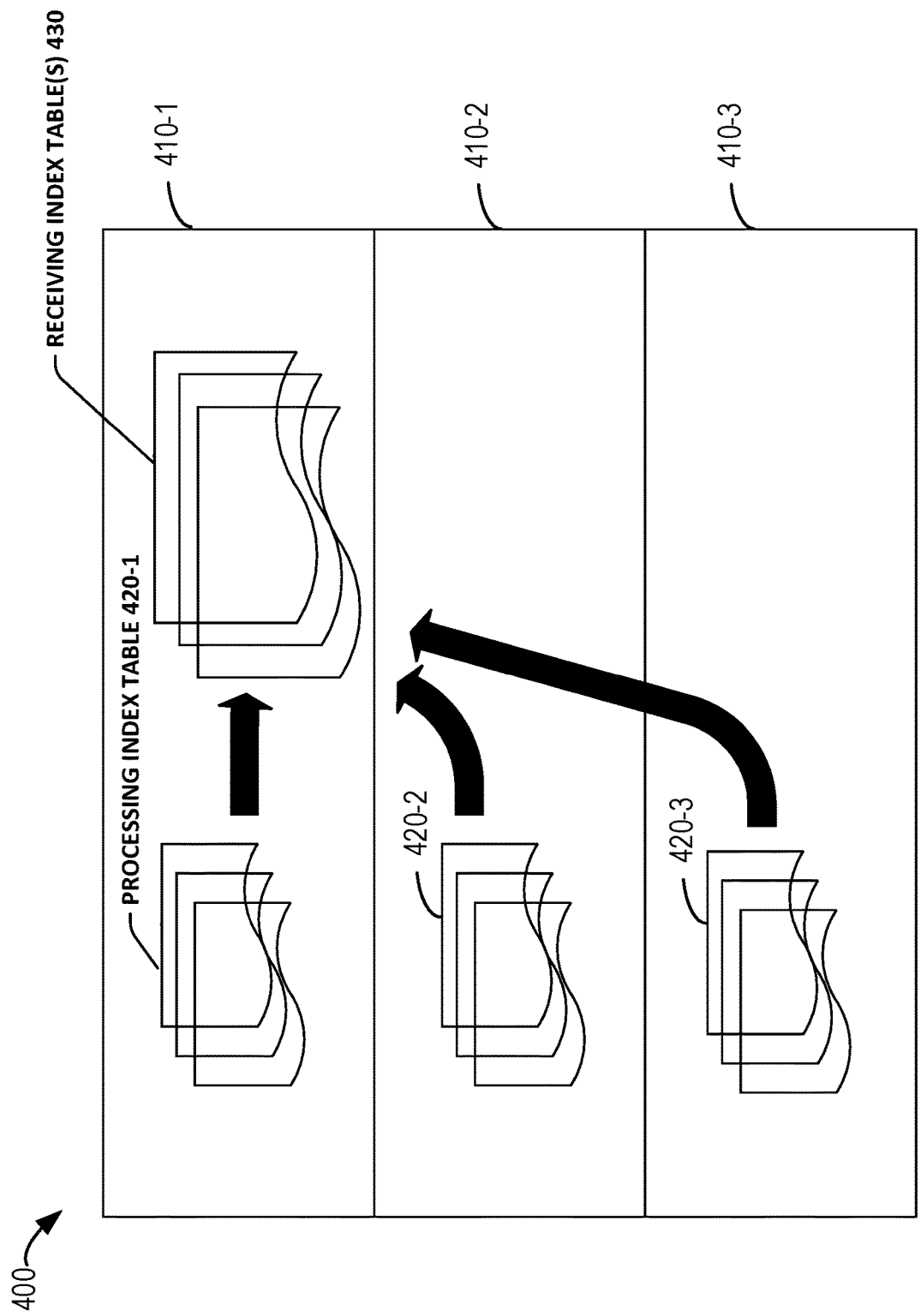
FIG. 4 illustrates a schematic diagram of an example arrangement of processing index tables and receiving index tables in an index processing system according to embodiments of the present disclosure.

FIG. 4 illustrates a schematic diagram of an example arrangement 400 of processing index tables and receiving index tables in an index processing system according to embodiments of the present disclosure. In the arrangement 400, processing index tables 420-1, 420-2, 420-3 (collectively referred to as processing index table 420) and a receiving index table (430) according to embodiments of the present disclosure are stored in index processing apparatuses 410-1, 410-2, 410-3 (collectively referred to as index processing apparatus 410). It would be appreciated that the arrangement 400 is described as an example, without implying any limitation to the scope of the present disclosure. It should be appreciated that the specific number of devices are provided merely as an example, without implying any limitation to the scope of the present disclosure. For example, the index processing system according to the embodiments of the present disclosure may include therein more or fewer index tables.

Returning now to FIG. 3, at 320, the control device 110 obtains information related to the processing tables 420 in the index processing system 100.

In some embodiments, the control device 110 may obtain the number of documents associated with respective entries in the processing index tables 420. Alternatively or additionally, the control device 110 may obtain the amount of data in respective entries in the processing index tables 420. Alternatively or additionally, the control device 110 may obtain the amount of data of documents associated with the respective entries in the processing index tables 420. It should be noted that the obtained information enumerated herein is illustrative, rather than restrictive.

The index processing system 100 further includes therein receiving index tables 430 used for storing at least a part of indices in the processing index tables 420. If the total amount of data of a part of entries in a processing index table 420 and the corresponding documents exceeds a predetermined first threshold amount of data, then the part of entries in the processing index table 420 is merged into entries in a receiving index table 430, the documents associated with the part of entries in the processing index table 420 are made to be associated with the receiving index table 430, and the part of entries is deleted from the processing index table 420.

The receiving index table 430 may be located in the same index processing apparatus 410 as the processing index table 420, or may be located in a different index processing apparatus 410 than the processing index table 420.

At 330, the control device 110 adjusts, based on the number of indexing requests and the obtained information, the number of processing index tables 420.

In some embodiments, if the amount of data to be indexed is small, there may be one processing index table only. For example, the index processing apparatus 410-1 includes therein one processing index table 420-1, and the index processing apparatus 410-1 stores all indices generated based on the indexing requests into the processing index table 420-1. When the amount of data to be indexed increases (for example, when the number of indexing requests determined by the control device 110 is greater than a first threshold number, a new processing index table is generated. As aforementioned, since an index table can be associated with a limited number of documents only, generation of a new index table facilitates indexing a larger number of documents.

In preferred embodiments, a new processing index table is generated at a different index processing apparatus than the index processing apparatus where the existing processing index table is located. For example, a new processing index table 420-2 is generated at the index processing apparatus 410-2. As discussed above, since the index processing apparatus 410 may be a distributed resource unit distributed over a plurality of physical nodes, system resources may be fully utilized and the processing capability of the system may be improved by using different index processing apparatuses to parallel processing a plurality of requests received, each index processing apparatus 410 allocating its received requests to respective nodes included therein for parallel processing. In addition, in preferred embodiments, each index processing apparatus 410 includes at most a processing index table.

As the amount of data to be indexed is increasing, for example, when the number of indexing requests determined by the control device 110 is greater than a predetermined threshold number higher than the first threshold number, a further new processing index table is generated, for example, the processing indexing table 420-3 in FIG. 4, and so forth.

In the meantime, as described above, over time, when the control device 110 determines, based on the obtained information, that the total amount of data of a part of entries in the processing index table 420 and the corresponding documents exceeds a predetermined first threshold amount of data, the part of entries in the processing index table 420 is merged into entries in the receiving index table 430, the documents associated with the part of entries in the processing index table 420 are made to be associated with the receiving index table 430, and the part of entries is deleted from the processing index table 420. In this way, the processing index table 420 will not grow continuously, which is beneficial for the subsequent indexing process.

On the other hand, as the amount of data to be indexed is decreasing, for example, when the number of indexing requests determined by the control device 110 is less than a second threshold number, one of existing processing index tables is deleted. For example, as shown in FIG. 4, when the number of indexing requests determined by the control device 110 is less than a second threshold number, one of the processing index tables 420-1, 420-2 and 420-3 is selected and deleted.

Alternatively, in some other embodiments, when the amount of data to be indexed is small, there may be no processing index table 420, but only one receiving index table 430. In this case, the receiving index table 430 may store indices generated based on the index requests; however, when a processing index table is generated in the case that the number of indexing requests determined by the control device 110 is greater than the first threshold number, the receiving index table 430 no longer stores the indices generated based on the indexing request.

Indexing process is both CPU and IO intensive. With the above example embodiments, the number of processing index tables are adjusted dynamically based on the number of indexing requests received within a predetermined period of time, and it therefore can be achieved that more processing index tables operate in a plurality of index processing apparatuses when massive data arrive, thereby utilizing more resources and improving indexing throughput significantly. In addition, this is advantageous to the search process. Since the processing index tables are typically small and distributed over various index processing apparatuses, results can be returned more quickly when search is performed on the index tables, such that the search efficiency can be improved.

Figure 5:
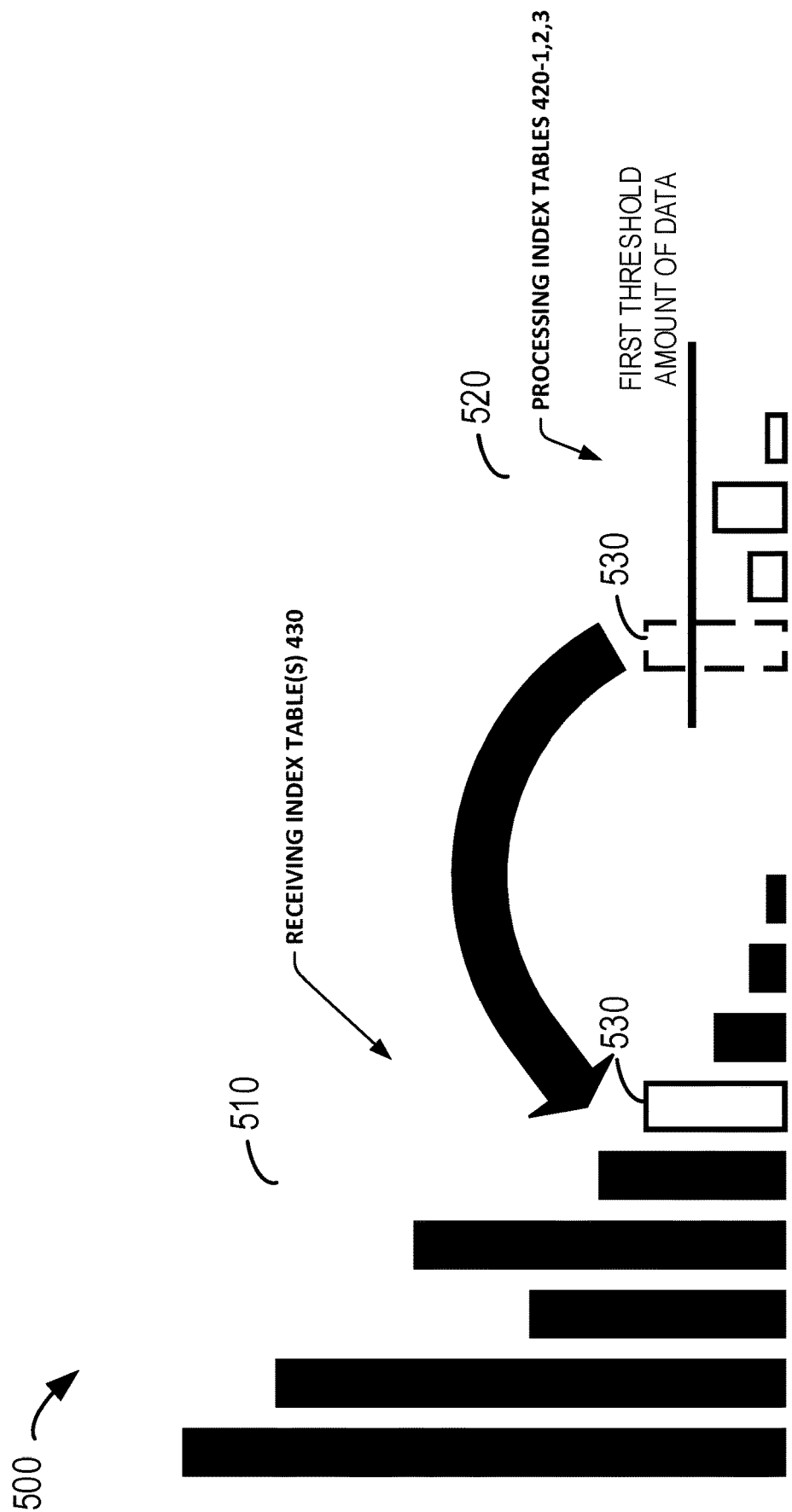
FIG. 5 illustrates a schematic diagram of statistics corresponding to a processing index table and a receiving index table according to embodiments of the present disclosure.

FIG. 5 illustrates a schematic diagram 500 of statistics corresponding to a processing index table and a receiving index table according to embodiments of the present disclosure. FIG. 5 illustrates a statistical chart 510 of amount of data of respective parts corresponding to the receiving index table, and a statistical chart 520 of amount of data of respective parts corresponding to the processing index table. As aforementioned, the amount of data of the respective parts refers to a total amount of data of entries of the respective part of the index table and the corresponding documents. It should be appreciated that the diagram 500 is described as an example only, without implying any limitation to the scope of the present disclosure. It would be appreciated that the specific number of respective parts in the index table is provided merely as an example, without implying any limitation to the scope of the present disclosure.

The control device 110 determines a surplus part in the processing index table. In some embodiments, the surplus part may be defined as: when the total amount of data including amount of data of one or more documents and amount of data of entries corresponding to the one or more documents exceeds the first threshold amount of data, the entries corresponding to one or more documents are referred to as a surplus part. As shown in FIG. 5, the statistical chart 520 corresponding to the processing index table indicates that a part corresponding to a column 530 is determined as the surplus part.

Subsequently, the control device 110 performs the following acts: splitting entries of the determined surplus part from the processing index table, and marking these entries and the documents associated with these entries as "deleted"; copying these entries and adding them to the receiving index table, and associating the receiving index table and the documents associated with these entries; and then deleting these entries from the processing index table (for example, the process may be implemented through IndexSplitter API and IndexWriter.addIndexes API in a Lucene toolkit). As shown in FIG. 5, after merging the surplus part into the receiving index table, the column 530 corresponding to the surplus part appears in the statistical chart 510 corresponding to the receiving index table. The surplus part being merged may still serve for search requests, and when the merge process is completed, the surplus part is deleted from the processing index table. If a search request occurs during the merge process, the same document may probably be returned by both the receiving index table and one of the processing index tables. In this case, de-duplication of the returned results is required.

In preferred embodiments, the first threshold amount of data is set as a small value, and the merge process therefore does not result in large network traffic.

With the above example embodiments, the surplus part in the processing index table is merged into the receiving index table, the processing index table thus will not grow continuously to ensure a relatively fast processing speed in the subsequent indexing process.

Figure 6:
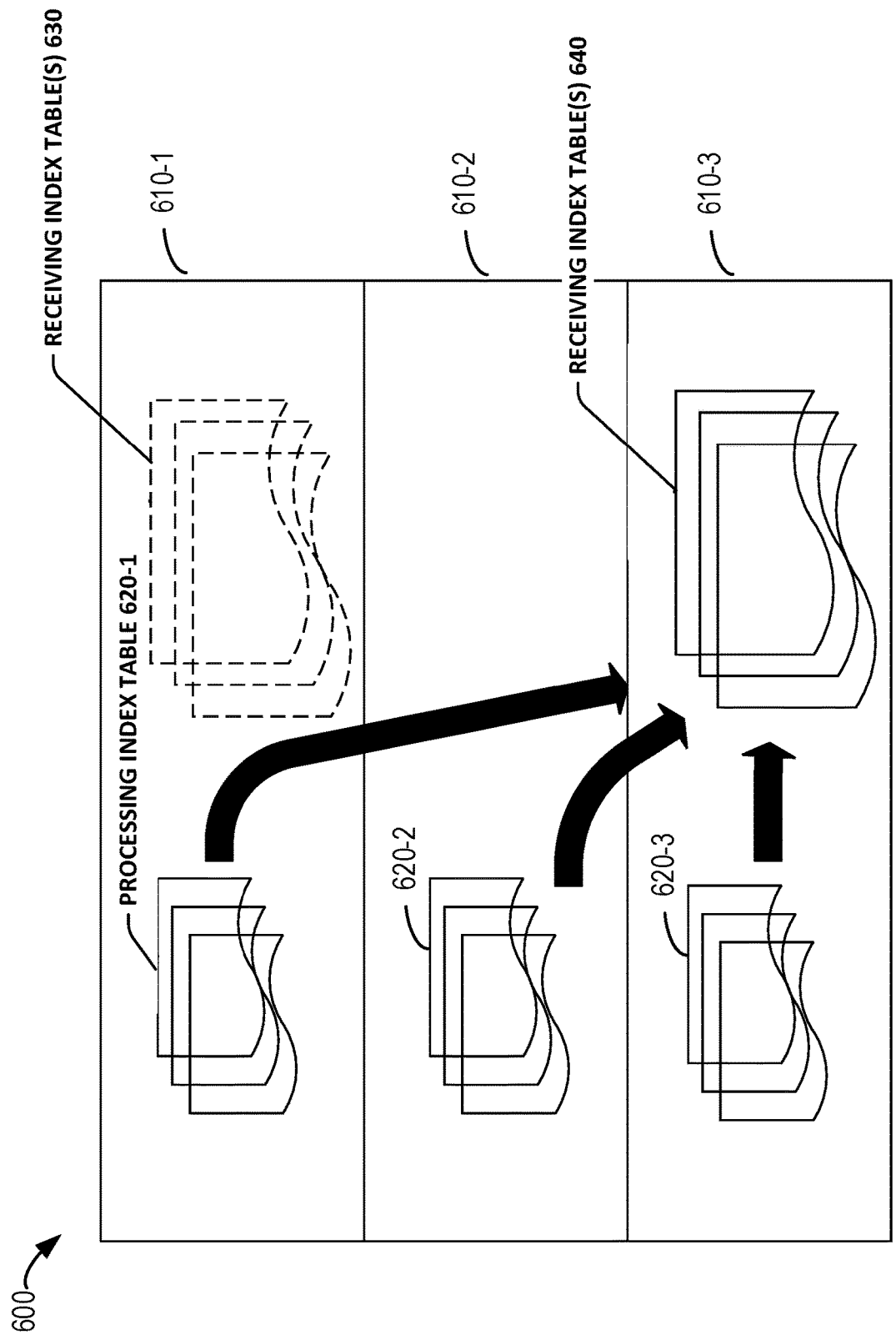
FIG. 6 illustrates a schematic diagram of an example arrangement of processing index tables and receiving index tables in an index processing system according to embodiments of the present disclosure.

FIG. 6 illustrates a schematic diagram of an example arrangement 600 of processing index tables and receiving index tables in an index processing system according to embodiments of the present disclosure. In the arrangement 600, processing index tables 620-1, 620-2, 620-3 (collectively referred to as index table 620) and a receiving index table 630 according to embodiments of the present disclosure are stored in index processing apparatuses 610-1, 610-2, 610-3 (collectively referred to as index processing apparatus 610). It would be appreciated that the arrangement 600 is described merely as an example, without implying any limitation to the scope of the present disclosure. It would be appreciated that the specific number of index tables as shown is given illustratively, without implying any limitation to the scope of the present disclosure. For example, the index processing system according to the embodiments of the present disclosure may include more or fewer index tables.

Similar to FIG. 4, the processing index table 620 is used for storing indices generated based on indexing requests, and the receiving index table 630 is used for storing at least a part of indices in the processing index table. Since the receiving index table 630 receives surplus parts from all of the processing index tables 620, for a system running for a long time, the amount of data of the receiving index table 630 and the associated documents grows remarkably over time. Considering that each search runs a single thread on a single index table, search latency is related to the size of the index table. An index table that is too large may lead to the system being out-of-memory, thereby resulting in a poor performance of search and merging.

In some embodiments, when the control device 110 determines that the amount of data corresponding to the receiving index table 630 is greater than a second threshold amount of data, the receiving index table 630 no longer receives the surplus parts of the processing index tables 620, and a new receiving index table 640 will be generated. In addition, in some embodiments, the control device 110 may mark the receiving index table 630 as "ceased receiving." The "ceased receiving" receiving index table 630 may be used for search and data purge, but may no longer be used for merging.

In some preferred embodiments, the control device 110 generates a new receiving index table 640 at an index processing apparatus different than the index processing apparatus having the receiving index table 630. Alternatively, the control device 110 may determine an index processing apparatus having the least number of "ceased receiving" receiving index tables, and generate a new receiving index table 640 therein. In this way, the "ceased receiving" receiving index table, which has a large amount of data, is distributed over different index processing apparatuses to balance system resources. In addition, in some preferred embodiments, the second threshold amount of data is set as 50 G.

With the above example embodiment, each receiving index table in the system will not grow too large, thereby maintaining a better performance in search and merging. Moreover, when data purge is required, it can be performed on the "ceased receiving" receiving index table only, without affecting other active index tables, namely processing index tables being used for indexing requests or receiving index tables being used for merging.

Figure 7:
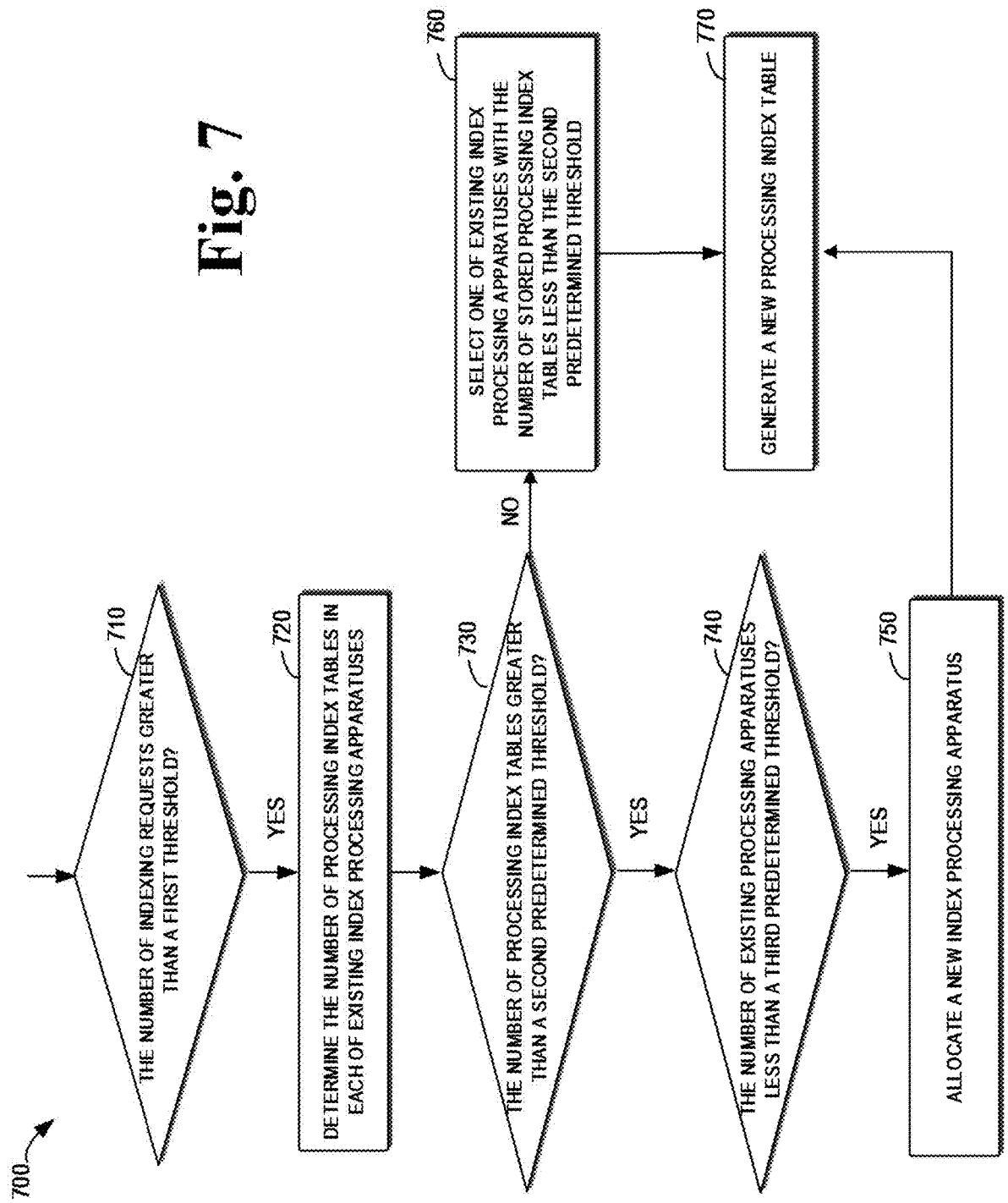
FIG. 7 illustrates a flowchart of a method of generating a new processing index table according to embodiments of the present disclosure.

FIG. 7 illustrates a flowchart of a method 700 of generating a new processing index table according to embodiments of the present disclosure. For example, the method 700 may be performed by the control device 100 as shown in FIG. 1. It would be appreciated that the method 700 may also be performed by other devices, and the scope of the present disclosure is not limited in this regard. It is to be understood that the method 700 may include additional acts not shown and/or may skip the acts shown, and the scope of the present disclosure is not limited in this regard.

In some embodiments, when a new processing index table needs to be generated and where a new processing index table should be generated may be determined jointly by the number of indexing requests within a predetermined period of time, determined by the control device 110, the number of processing index tables that each index processing apparatus is allowed to store, predetermined by the control device 110, and the relatively large number of index processing apparatuses allowed in the system, predetermined by the control device 110.

More specifically, at 710, the control device 110 determines whether the number of indexing requests for documents received within a predetermined period of time is greater than a first threshold. If yes, it is indicated that there are a lot of data to be processed currently, then it is required to add a new processing index table to improve the indexing throughput.

At 720, the control device 110 determines the number of processing index tables in each of the existing index processing apparatuses. At 730, the control device 110 determines whether the number of processing index tables in each of the existing index processing apparatuses is greater than a second predetermined threshold. The second predetermined threshold is the predetermined number of processing index tables that each index processing apparatus is allowed to store, in order to balance the allocation of system resources.

If there are existing index processing apparatuses with the number of stored processing index tables less than the second predetermined threshold, the control device 110 selects at 760 one of the existing index processing apparatuses, to generate a new processing index table at 770. In addition, in some embodiments, the control device 110 selects an existing index processing apparatus storing a smaller number of processing index tables to generate a new processing index table.

If the number of processing index tables in each of the existing index processing apparatuses is greater than the second predetermined threshold, it is indicated that none of the existing index processing apparatuses can store a new processing index table, and therefore it is required to allocate a new index processing apparatus.

At 740, the control device 110 determines whether the number of existing index processing apparatuses is less than a third predetermined threshold. The third predetermined threshold is a predetermined relatively large number of index processing apparatuses allowed in the system.

If the number of existing index processing apparatuses is less than the third predetermined threshold, the control device 110 allocates at 750 a new index processing apparatus, to generate a new processing index table at 770.

In the above example embodiment, balanced distribution of system resources can be achieved by setting a second predetermined threshold and a third predetermined threshold.

Figure 8:
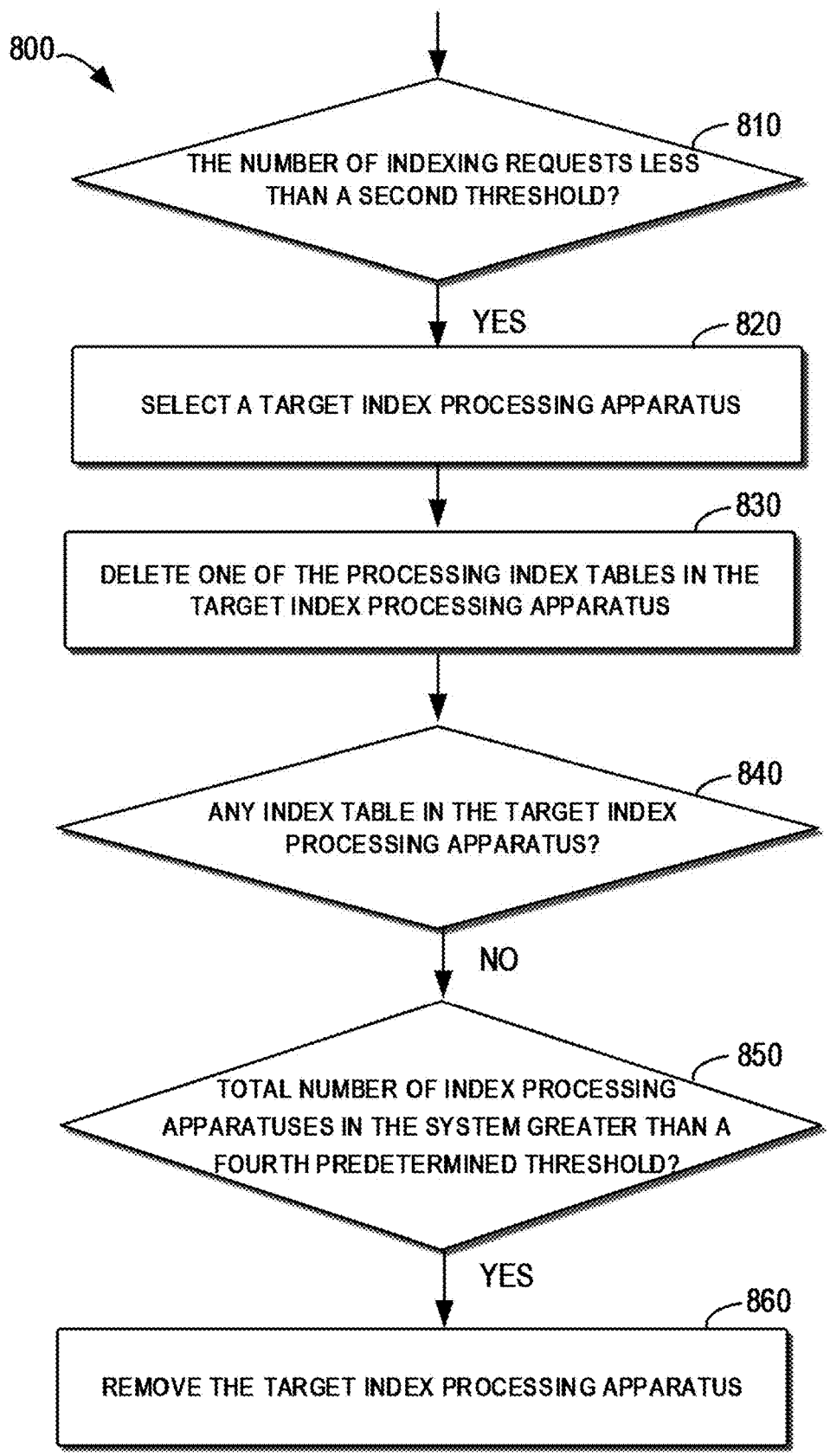
FIG. 8 illustrates a flowchart of a method of deleting an existing processing index table according to embodiments of the present disclosure.

FIG. 8 illustrates a flowchart of a method 800 of deleting an existing processing index table according to embodiments of the present disclosure. For example, the method 800 may be performed by the control device 110 as shown in FIG. 1. It would be appreciated that the method 800 may also be performed by other devices, and the scope of the present disclosure is not limited in this regard. It is to be understood that the method 800 may include additional acts not shown and/or may skip the acts shown, and the scope of the present disclosure is not limited in this regard.

In some embodiments, when an existing processing index table needs to be deleted and from where an existing processing index table should be deleted may be determined jointly by the number of indexing requests within a predetermined period of time, determined by the control device 110, the number of index tables stored in the index processing apparatuses, and the relatively small number of index processing apparatuses allowed in the system, predetermined by the control device 110.

More specifically, at 810, the control device 110 determines whether the number of indexing requests for documents received within a predetermined period of time is less than a second threshold. If yes, it is indicated that the current data to be processed is decreasing, and the processing index tables may be reduced accordingly to reduce the system load.

At 820, the control device 110 selects a target index processing apparatus from the existing index processing apparatuses to delete a processing index table. In some embodiments, the control device 110 selects one of the index processing apparatuses with the total number of stored processing index tables and receiving index tables greater than a first predetermined threshold, as the target index processing apparatus.

At 830, the control device 110 deletes a processing index table from the target index processing apparatus. In some embodiments, the control device 110 randomly deletes a processing index table from the target index processing apparatus. Alternatively, in some other embodiments, the control device 110 deletes a processing index table, based on the obtained information related to processing index tables, such as the number of documents associated with processing index tables, amount of data of respective entries in the processing index tables, amount of data of documents associated with processing index tables, and the like.

In some embodiments, the control device 110 marks the determined processing index table to be deleted as "being removed," merges all entries in the processing index table to be deleted into the receiving index table, associates the receiving index table and the documents associated with the processing index tables to be deleted, and then deletes the processing index table.

At 840, after having deleted the processing index table, the control device 110 determines whether the target index processing apparatus includes further index tables.

If there are no further index tables, it is indicated that the target index processing apparatus is empty, and then the control device 110 determines at 850 whether the total number of index processing apparatuses in the system is greater than a fourth predetermined threshold, the fourth predetermined threshold being a relatively small number of index processing apparatuses allowed in the system.

If the total number of index processing apparatuses in the system is greater than the fourth predetermined threshold, the control device 110 removes at 860 the empty target index processing apparatus, to save the system resources.

Figure 9:
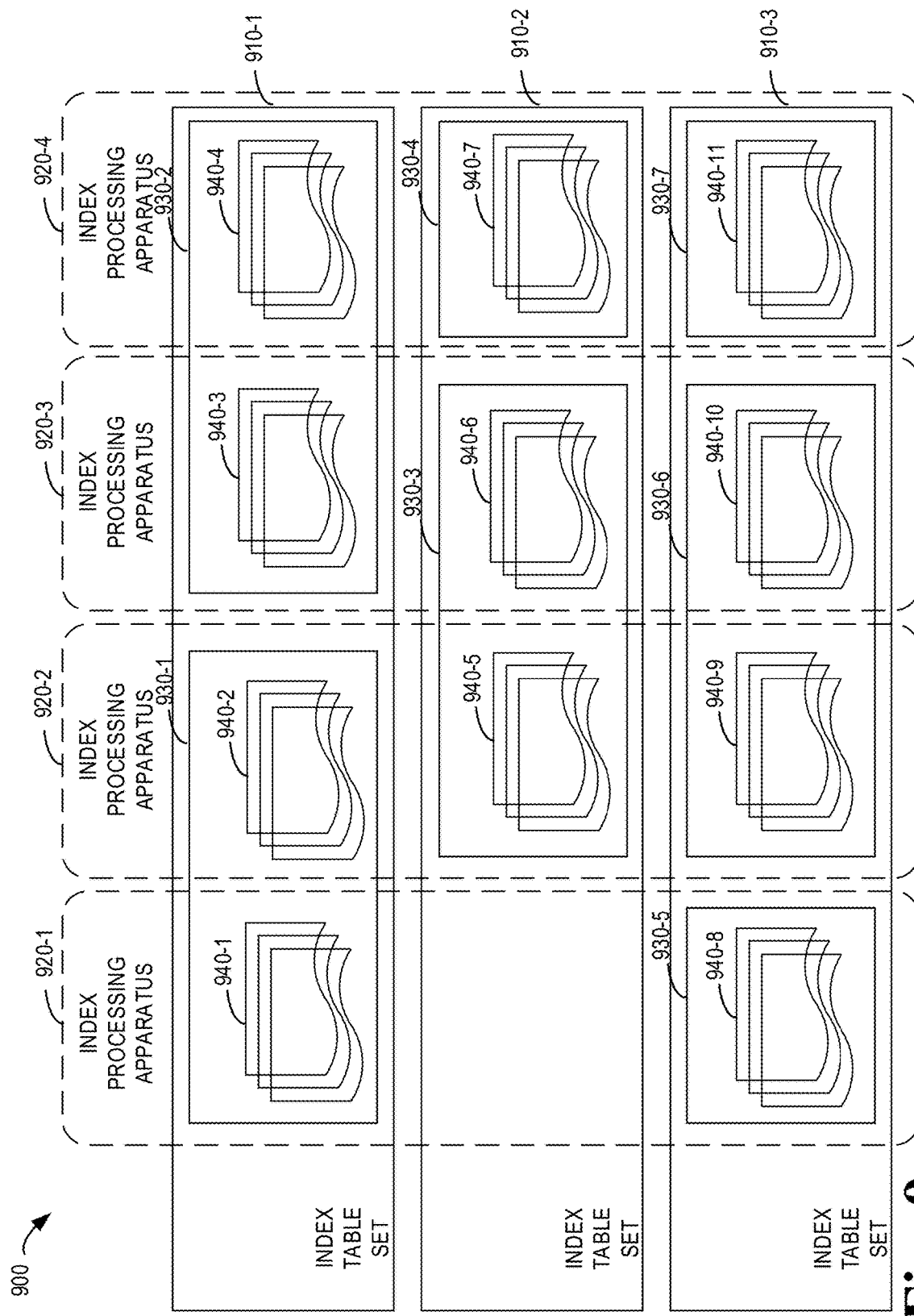
FIG. 9 illustrates a schematic diagram of an example arrangement of index tables according to embodiments of the present disclosure.

FIG. 9 illustrates a diagram of an example arrangement 900 of index tables according to embodiments of the present disclosure. It would be appreciated that the arrangement 900 is described merely as an example, without implying any limitation to the scope of the present disclosure. It is to be understood that the specific number of index tables or index processing apparatuses as shown is given illustratively, without implying any limitation to the scope of the present disclosure. For example, the index processing system according to embodiments of the present disclosure may include more or fewer index tables or index processing apparatuses.

As shown in FIG. 9, index table sets 910-1 to 910-3 (collectively referred to as index table set 910) are index table sets created for streaming data arrived at different times according to embodiments of the present disclosure. For the arrived streaming data, the index processing system 100 may determine the number of index table subsets 930 to be created, this number is fixed, and the documents in the streaming data are allocated to the index processing apparatuses 920 to store the index table subsets 930. A document ID may be used for determining in which index table subset 930 the document is located. The index table subset 930 includes therein processing index tables and receiving index tables 940 according to embodiments of the present disclosure. As discussed above, since the processing index tables and receiving index tables 940 are adjusted dynamically based on the arriving speed of the streaming data and the amount of data of the index tables, it is unknown in which index table a particular document is located, a user needs to send a search request to obtain the specific document. The processing index tables and receiving index tables 940 are adjusted dynamically by the system, which is invisible to users. In preferred embodiments, a consistent hash method or any hash method is used to allocate a document to a particular index table. Because all data associated with the processing index tables are merged into the receiving index table sooner or later, an allocation path table may be changed safely, without moving data between processing index tables.

In preferred embodiments, to fully utilize system resources, processing index tables and receiving index tables 940 are evenly distributed among nodes. As mentioned above, the index processing apparatus 920 may be a Kubernetes pod, which is managed by microservices in the Kubernetes pod.

In the index table arrangement according to embodiments of the present disclosure, operations such as search, document obtaining, document deleting, data purge, and the like may be performed on the index tables.

Regarding a search request, term search or aggregation search is performed on all index tables. Search processes are performed concurrently on respective index tables, and the index processing system merges results from all index tables and returns the results to a user. A document typically appears in one index table. However, in rare cases, a document may appear in the receiving index table and one of processing index tables. In these circumstance, de-duplication should be performed on the results when results are being merged.

Regarding a request for obtaining a document, a particular document is expected to be obtained via a document ID. Considering that the allocation table for the index table subset 930 is fixed, the document ID may be used to locate a particular index table subset. However, since the allocation table for the processing index tables and receiving index tables keeps changing, it is hard to determine which index table the document belongs to. Consequently, the request for obtaining a document should be sent to all index tables within the index table subset 930, and the document is returned when any index table is hit.

Regarding a request for deleting a document, the deleting request is performed in the index table where the data are located. In some embodiments, the document associated with the index table may be marked as "deleted" using a bitmap. When merging is performed, these documents are deleted permanently. As the index table subset 930 has a consistent allocation table, the deleting request can locate the index table subset 930 and then be sent to all the index tables within the index table subset. In the circumstance of processing streaming data, since the streaming data are appended only, it is not common to delete a particular document from the streaming search system. Instead, a data purge request is often used.

For the data purge request, in order to purge old data, all index tables should be examined. If there is a need for purging all data in an index table, the whole index table can be simply deleted. Otherwise, the documents associated with the index table will be marked as "deleted," and the index processing system will process the actual deleting operation when the index table is being merged.

Figure 10:
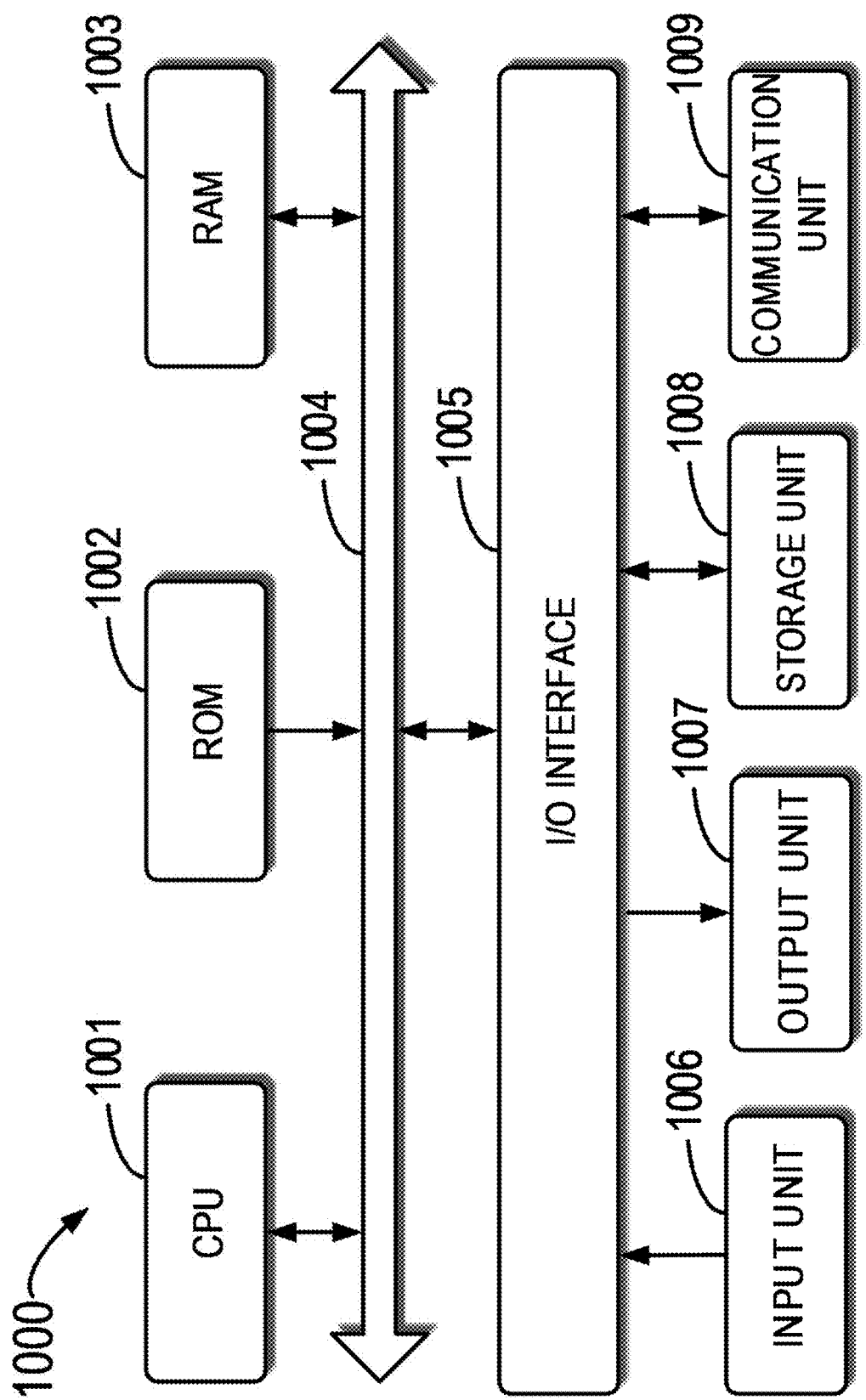
FIG. 10 illustrates a schematic block diagram of an example device that can be used to implement embodiments of the present disclosure.

FIG. 10 illustrates a schematic block diagram of an example device 1000 that can be used to implement embodiments of the present disclosure. For example, the control device 110 as shown in FIG. 1 may be implemented by the device 1000. As shown therein, the device 1000 includes a central processing unit (CPU) 1001 which performs various appropriate actions and processing, based on computer program instructions stored in a read-only memory (ROM) 1002 or computer program instructions loaded from a storage unit 1008 to a random access memory (RAM) 1003. The memory 1003 stores therein various programs and data required for operations of the device 1000. The CPU 1001, the ROM 1002 and the memory 1003 are connected via a bus 504 with one another. An input/output (I/O) interface 1005 is also connected to the bus 1004.

The following components in the device 1000 are connected to the I/O interface 1005: an input unit 1006 such as a keyboard, a mouse and the like; an output unit 1007 including various kinds of displays and a loudspeaker, etc.; a storage unit 1008 such as a magnetic disk, an optical disk, and etc.; a communication unit 1009 including a network card, a modem, and a wireless communication transceiver, etc. The communication unit 1009 allows the device 1000 to exchange information/data with other devices through a computer network such as the Internet and/or various kinds of telecommunications networks.

Various processes and processing described above, e.g., the methods 300, 700 and 800, may be executed by the processing unit 1001. For example, in some embodiments, the methods 300, 700 and 800 may be implemented as a computer software program that is tangibly included in a machine-readable medium, e.g., the storage unit 1008. In some embodiments, part or all of the computer programs may be loaded and/or mounted onto the device 1000 via ROM 1002 and/or communication unit 1009. When the computer program is loaded to the RAM 1003 and executed by the CPU 1001, one or more steps of the methods 300, 700 and 800 as described above may be executed.

The present disclosure may be a method, device, system, and/or computer program product. The computer program product may include a computer-readable storage medium having computer-readable program instructions thereon for carrying out aspects of the present disclosure.

The computer-readable storage medium may be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals sent through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer readable storage medium within the respective computing/processing device.

Computer-readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA), may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, device (systems), and computer program products according to embodiments of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor unit of a general purpose computer, special purpose computer, or other programmable data processing device to produce a machine, such that the instructions, when executed via the processing unit of the computer or other programmable data processing device, create means for implementing the functions/actions specified in the flowchart and/or block diagram block or blocks. These computer-readable program instructions may also be stored in a computer-readable storage medium that can direct a computer, a programmable data processing device, and/or other devices to function in a particular manner, such that the computer-readable storage medium having instructions stored therein includes an article of manufacture including instructions which implement aspects of the function/action specified in the flowchart and/or block diagram block or blocks.

The computer-readable program instructions may also be loaded onto a computer, other programmable data processing device, or other devices to cause a series of operational steps to be performed on the computer, other programmable devices or other device to produce a computer-implemented process, such that the instructions which are executed on the computer, other programmable device, or other devices implement the functions/actions specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which includes one or more executable instructions for implementing the specified logical function(s). In some alternative implementations, the functions noted in the block may occur out of the order noted in the figures. For example, two blocks in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those skilled in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method, comprising:
   facilitating, by a system comprising a processor, receiving respective ones of a first part of documents of an unbounded stream of documents from a document source, wherein the unbounded stream arrives at the system according to a variable arriving rate;
   for the respective ones of the first part of documents, generating, by the system, an index request for a first index processing device, wherein the index request causes the first index processing device to index a received document of the first part of documents in a first cached indexing table generated by the first index processing device;
   determining, by the system, a generating speed of respective indexing requests for the first part of documents;
   based on the variable arriving rate and the generating speed in relation to a first threshold, for a second part of the documents of the unbounded stream, allocating, by the system, a second index processing device to perform indexing of received documents of the second part of documents in a second cached indexing table generated by the second index processing device, wherein indexing the received documents of the second part of the unbounded stream by the second index processing device is performed in parallel with the first index processing device indexing the received document of the first part of documents into the first cached indexing table; and
   based on the variable arriving rate and an appropriate number of indexes to achieve an indexing performance requirement for generation of indexes, determining, by the system, whether to merge the first cached indexing table and the second cached indexing table into a first receiving table for searching, or generate a second receiving table and a third receiving table respectively from the first cached indexing table and the second cached indexing table, for searching.

2. The method of claim 1, wherein the generating speed in relation to the first threshold comprises the generating speed being above the first threshold that was selected to adjust processing resources allocated to the unbounded stream of documents.

3. The method of claim 1, further comprising:
   determining, by the system, a surplus part of the first cached indexing table, wherein an amount of data corresponding to the surplus part is greater than a second threshold amount of data;
   merging, by the system, first entries in the surplus part into second entries in the first receiving table;
   associating, by the system, the first receiving table and documents associated with the surplus part; and
   deleting, by the system, the surplus part.

4. The method of claim 1, further comprising:
   in response to determining that an amount of data corresponding to the first cached indexing table and the second cached indexing table is greater than a third threshold amount of data, ceasing, by the system, adding a new entry into the first cached indexing table and the second cached indexing table; and
   generating, by the system, a new indexing table at a second index processing device different from the first index processing device.

5. Indexing equipment, comprising:
   at least one processing unit; and
   at least one memory coupled to the at least one processing unit, that stores executable instructions that, when executed by the at least one processing unit facilitate performance of operations, comprising:
   receiving respective ones of a first part of documents of an unbounded stream of documents from a document source, wherein the unbounded stream arrives according to a variable arriving rate, indexing a received document of the first part of documents in a first cached indexing table, determining a generating speed of respective indexing requests for the first part of documents;

based on the variable arriving rate and the generating speed in relation to a first threshold, for a second part of the documents of the unbounded stream, indexing received documents of the second part of documents in a second cached indexing table, wherein indexing the received documents of the second part of the unbounded stream is performed in parallel with indexing the received document of the first part of documents into the first cached indexing table; and based on the variable arriving rate and an appropriate number of indexes to achieve an indexing performance requirement for generation of indexes, determining whether to merge the first cached indexing table and the second cached indexing table into a first receiving table for searching, or generate a second receiving table and a third receiving table respectively from the first cached indexing table and the second cached indexing table, for searching.

6. The indexing equipment of claim 5, wherein the second cached indexing table was generated by other indexing equipment different from the indexing equipment.

7. The indexing equipment of claim 5, wherein the operations further comprise:

merging the first cached indexing table and the second cached indexing table into a searchable index;

determining a surplus part of the first cached indexing table;

based on an amount of data corresponding to the surplus part being greater than a second threshold amount of data, merging first entries in the surplus part into second entries in the searchable index;

associating the first searchable index with documents associated with the surplus part; and deleting the surplus part.

8. The indexing equipment of claim 7, wherein the operations further comprise:

in response to determining that an amount of data corresponding to the searchable index is greater than a third threshold amount of data, ceasing adding to the searchable index; and generating a new searchable index to receive entries from the first cached indexing table and the second cached indexing table.

9. A non-transitory machine-readable medium, comprising executable instructions that, when executed by a processor of an index manager device, facilitate performance of operations, comprising:

receiving respective ones of a first part of documents of an unbounded stream of documents from a document source, wherein the unbounded stream arrives at the index manager device according to a variable arriving rate;

for the respective ones of the first part of documents, generating an index request for a first index processing device, wherein the index request causes the first index processing device to index a received document of the first part of documents in a first cached indexing table generated by the first index processing device;

determining a generating speed of respective indexing requests for the first part of documents;

based on the variable arriving rate and the generating speed in relation to a first threshold, for a second part of the documents of the unbounded stream, allocating a second index processing device to perform indexing of received documents of the second part of documents in a second cached indexing table generated by the second index processing device, wherein indexing the received documents of the second part of the unbounded stream by the second index processing device is performed in parallel with the first index processing device indexing the received document of the first part of documents into the first cached indexing table; and based on the variable arriving rate and an appropriate number of indexes to achieve an indexing performance requirement for generation of indexes, determining whether to merge the first cached indexing table and the second cached indexing table into a first receiving table for searching, or generate a second receiving table and a third receiving table respectively from the first cached indexing table and the second cached indexing table, for searching.

10. The method of claim 1, wherein the performance requirement comprises a requirement based on an estimated size for the first receiving table.

11. The method of claim 1, wherein the performance requirement comprises a requirement to index the unbounded stream at a selected rate.

12. The method of claim 1, wherein the variable arriving rate in relation to the first threshold comprises the variable arriving rate being greater than the first threshold frequency of documents arriving via the unbounded stream to be indexed.

13. The method of claim 1, wherein the performance requirement comprises a requirement that no end of the unbounded stream of documents is predicted within a period of time.

14. The indexing equipment of claim 5, wherein the performance requirement comprises an estimated size for the first receiving table being determined to be larger than a fourth threshold.

15. The indexing equipment of claim 5, wherein the performance requirement comprises a requirement to index the unbounded stream at a selected rate.

16. The indexing equipment of claim 5, wherein the performance requirement comprises that no end of the stream of documents is predicted within a period of time.

17. The indexing equipment of claim 5, wherein the operations further comprise, generating a second searchable index and a third searchable index, respectively, from the first cached index and the second cached index.

18. The non-transitory machine-readable medium of claim 9, wherein the indexing performance requirement comprises a predicted size for the first receiving table at a predicted time the unbounded stream will stop.

19. The non-transitory machine-readable medium of claim 9, wherein the indexing performance requirement comprises a predicted rate of indexing the unbounded stream of documents.

20. The indexing equipment of claim 5, wherein the generating speed in relation to the first threshold comprises the generating speed being above the first threshold that was selected to adjust processing resources allocated to the unbounded stream of documents.

* * * * *